(12) United States Patent
Pham et al.

(10) Patent No.: US 12,426,577 B2
(45) Date of Patent: Sep. 30, 2025

(54) UNDERWATER NET MONITORING DEVICE

(71) Applicant: TidalX AI Inc, San Ramon, CA (US)

(72) Inventors: Harrison Pham, Sunnyvale, CA (US); Thomas Robert Swanson, Sunnyvale, CA (US)

(73) Assignee: TidalX AI Inc., Mountain View, CA (US)

(*) Notice: Subject to any disclaimer, the term of this patent is extended or adjusted under 35 U.S.C. 154(b) by 312 days.

(21) Appl. No.: 18/202,578

(22) Filed: May 26, 2023

(65) Prior Publication Data

US 2024/0130336 A1 Apr. 25, 2024
US 2024/0224956 A9 Jul. 11, 2024

Related U.S. Application Data

(60) Provisional application No. 63/417,584, filed on Oct. 19, 2022.

(51) Int. Cl.
*A01K 63/00* (2017.01)
*G01N 19/08* (2006.01)

(52) U.S. Cl.
CPC ............ *A01K 63/00* (2013.01); *G01N 19/08* (2013.01)

(58) Field of Classification Search
CPC ................................ A01K 63/00; G01N 19/08
See application file for complete search history.

(56) References Cited

U.S. PATENT DOCUMENTS 4,791,410 A * 12/1988 Larsson ................ G08B 13/20
340/544
10,856,520 B1 12/2020 Kozachenok et al.
(Continued)

FOREIGN PATENT DOCUMENTS

CN 108040948 5/2018
EP 2244934 11/2010
(Continued)

OTHER PUBLICATIONS

Extended Search Report in European Appln. No. 22151132.2, dated May 2, 2022, 10 pages.
(Continued)

*Primary Examiner* — Clayton E. LaBalle
*Assistant Examiner* — Diana Hancock
(74) *Attorney, Agent, or Firm* — Fish & Richardson P.C.

(57) ABSTRACT

A net monitoring system, including: a plurality of net monitoring devices, each net monitoring device including: a housing; a plurality of tensioning arms, each tensioning arm reversibly extendable through the housing and configured to reversibly secure to a net, each tensioning arm including a force sensor configured to generate a tension signal indicative of a tension applied to the corresponding tensioning arm; a tensioning mechanism configured concurrently retract the plurality of tensioning arms into the housing; an impulse generating device, configured to generate an impulse responsive to a command; and a communications device configured to receive the tension signals from the plurality of force sensors, and transmit the tension signals through water; and a controller, configured to: command at least one of the plurality of net monitoring devices to generate the impulse; receive the tension signals responsive to the command to generate the impulse; and determine, based on the received tension signals, a presence of a defect in a net on which the plurality of net monitoring devices are installed.

18 Claims, 7 Drawing Sheets

(56) References Cited

U.S. PATENT DOCUMENTS

| | | | |
|---|---|---|---|
| 11,237,078 B2* | 2/2022 | Manenti | H02G 1/02 |
| 2017/0150701 A1 | 6/2017 | Gilmore et al. | |
| 2019/0228218 A1 | 7/2019 | Barnaby et al. | |
| 2019/0340440 A1 | 11/2019 | Atwater et al. | |
| 2020/0107524 A1 | 4/2020 | Messana et al. | |
| 2020/0155882 A1 | 5/2020 | Tohidi et al. | |
| 2020/0288678 A1 | 9/2020 | Howe et al. | |
| 2021/0262877 A1* | 8/2021 | Hansen | A01K 75/00 |
| 2022/0159936 A1 | 5/2022 | James | |
| 2024/0215554 A1* | 7/2024 | Pham | A01K 61/60 |

FOREIGN PATENT DOCUMENTS

| | | |
|---|---|---|
| EP | 3484283 | 5/2019 |
| JP | 2002171853 | 6/2002 |
| KR | 20200067743 | 6/2020 |
| NO | 300401 | 5/1997 |
| NO | 345259 B1 | 12/2019 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2014/179482 | 11/2014 |
| WO | WO 2018/011744 | 1/2018 |
| WO | WO 2018/080315 | 5/2018 |
| WO | WO 2019/002881 | 1/2019 |
| WO | WO 2019/121851 | 6/2019 |
| WO | WO 2019/122522 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2022/021804 | 2/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
International Search Report and Written Opinion in International Appln. No. PCT/US2023/031514, dated Nov. 27, 2023, 15 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon Salmo Salar," Journal of Fish Biology, Nov. 2017, 91(6):1699-1712.
Tao et al., "Omnidirectional surface vehicle for fish cage inspection," Oceans 2018 MTS/IEEE Charleston, Oct. 22, 2018, pp. 1-6.

* cited by examiner

UNDERWATER NET MONITORING DEVICE

CLAIM OF PRIORITY

This application claims priority under 35 USC § 119(e) to U.S. Patent Application Ser. No. 63/417,584, filed on Oct. 19, 2022, the entire contents of which are hereby incorporated by reference.

FIELD OF THE DISCLOSURE

The disclosure relates to monitoring devices and more specifically, to underwater net monitoring devices in aquaculture.

BACKGROUND

Aquaculture is a marine farming technique in which farms for marine life are placed offshore and/or in freshwater sources. Aquaculture pens are large and flexible enclosures for maintaining marine life populations in controlled areas of the water. The nets can develop bulges and move around due to prevailing currents, and can be damaged by abrasion, impact from boats, local fauna, or pen equipment. The nets can also develop biofouling which increases drag and generates stiffer forces on the net. Net inspection is currently a manual process and requires sending a diver or camera down with a human operator to look for damage or holes. Further, manual processes are often time-consuming, expensive, inaccurate, and can be delayed, such as when work schedules or adverse weather conditions decrease the availability of human monitors.

When fish escape through a torn net of a pen, remediation efforts typically involve attempting to catch and return the escaped fish, such as by hiring sport fisherman or the use of Fjord nets. However, these methods tend to be both expensive and ineffective.

SUMMARY

Provided in this disclosure are system and methods for monitoring aquaculture nets using distributed net monitoring devices. The devices are releasable attached to the net and create and maintain tension in the strands of the net. The devices produce impulse signals through the attachment points which traverse the net to be received by other attached net monitoring devices. The devices are networked using acoustic modems to a control device which receives signals indicative of the tension sensed by the net monitoring devices.

The devices generate power from motion sufficient to power the integrated components of the devices. The devices outputs regular, e.g., scheduled, or irregular signals, e.g., in response to a command, through the surrounding water. The control device for the net monitoring system receives the signals from the water.

In general, and in one aspect, disclosed herein is a net monitoring system, including: a plurality of net monitoring devices, each net monitoring device including: a housing; a plurality of tensioning arms, each tensioning arm reversibly extendable through the housing and configured to reversibly secure to a net, each tensioning arm including a force sensor configured to generate a tension signal indicative of a tension applied to the corresponding tensioning arm; a tensioning mechanism configured concurrently retract the plurality of tensioning arms into the housing; an impulse generating device, configured to generate an impulse responsive to a command; and a communications device configured to receive the tension signals from the plurality of force sensors, and transmit the tension signals through water; and a controller, configured to: command at least one of the plurality of net monitoring devices to generate the impulse; receive the tension signals responsive to the command to generate the impulse; and determine, based on the received tension signals, a presence of a defect in a net on which the plurality of net monitoring devices are installed.

Examples can include the follow features. The defect can be a hole, a bulge, a biofouling, or an animal. The communications device and the controller can be configured to communicate with acoustic signals. The communications device can be configured to encode the tension signals in a carrier signal and transmit the carrier signal through the water. The plurality of net monitoring devices can be configured to transmit the tension signals on a regular schedule, an irregular schedule, in response to receiving a command to transmit the signals, or a combination thereof.

In one aspect, disclosed herein is a net monitor device, including: a housing; a plurality of tensioning arms, each tensioning arm reversibly extendable through the housing and configured to reversibly secure to a net, each tensioning arm including a force sensor configured to generate a tension signal indicative of a tension applied to the corresponding tensioning arm; a tensioning mechanism configured concurrently retract the plurality of tensioning arms into the housing; an impulse generating device, configured to generate an impulse in the plurality of tensioning arms; and a transmitter configured to receive the tension signals from the plurality of force sensors, and transmit the tension signals through water.

Examples can include the follow features. The plurality of tensioning arms can include one or more pairs of tensioning arms, each pair of tensioning arms arranged in parallel. The tensioning mechanism can be configured to apply the tensioning force to each pair of the plurality of tensioning arms in parallel and in opposing directions. The tensioning mechanism can be configured to apply a substantially equal tensioning force to the plurality of tensioning arms concurrently. The tensioning mechanism can be configured to be operated by a hand of a user. The tensioning mechanism can be configured to retract the plurality of tensioning arms responsive to a user input, or a command received by the transmitter. The net monitoring device can be configured to be positively buoyant. The impulse generating device can be a two-state solenoid. The net monitoring device can further include a power source, and a power generation module. The power source can include a battery, or a capacitor. The power generation module can include a piezoelectric device configured to generate power based on motion of the plurality of tensioning arms.

In one aspect, disclosed herein is a method of monitoring a net, including: generating an impulse in one of a plurality of net monitoring devices secured to a net; receiving, responsive to the generating, in the remaining plurality of net monitoring devices secured to the net, a plurality of tension signals from a plurality of force sensors in each net monitoring device; transmitting the plurality of tension signals through water; receiving the plurality of tension signals through the water; and determining, based on the received plurality of tension signals, a presence of a defect in the net.

Examples can include the follow features. The transmitting can include encoding the plurality of tension signals into a carrier signal, and transmitting the carrier signal through the water, and the receiving can include receiving the carrier signal and decoding the plurality of tension signals from the carrier signal.

Particular implementations of the subject matter described in this specification can be implemented so as to realize one or more of the following technical advantages.

The methods and devices disclosed herein are designed and constructed using components having low power requirements which increases the deployment duration for the net monitoring system without intervention by a user. The net monitoring devices of the net monitoring system generate sufficient power from the motion of the net and surrounding water to be self-sustaining which increases the deployment simplicity.

The methods and devices disclosed herein utilize acoustic modems which facilitates wireless operation of the net monitoring system. Wireless operation reduces the points of failure for the net monitoring system thereby increasing the deployable lifetime of the system and facilitates scalability from low (e.g., 2) to high (e.g., 10 or more) numbers of net monitoring devices.

The methods and devices disclosed herein are deployable by hand-installation which reduces the man hours spent on installation or upkeep. This reduces the overall complexity of the net monitoring system, increases the speed of deployment, and facilitates installation without additional tools.

The methods and devices disclosed herein can form a mesh network including a portion, or all, of the deployed net monitoring devices. Forming a mesh network between the deployed net monitoring devices increases the scalability of the net monitoring system to accommodate high numbers of devices for large nets.

The methods and devices disclosed herein generate impulse signals at low tension ranges which reduce damage to existing defects, e.g., severed strands.

The methods and devices disclosed herein facilitate simple installation which enables retrofitting of existing deployed nets which reduces overhead costs of deployment.

The details of one or more embodiments are set forth in the accompanying drawings and the description below. Other features and advantages will be apparent from the description and drawings, and from the claims.

DESCRIPTION OF DRAWINGS

In the figures, like references indicate like elements.

DETAILED DESCRIPTION

Figure 1:
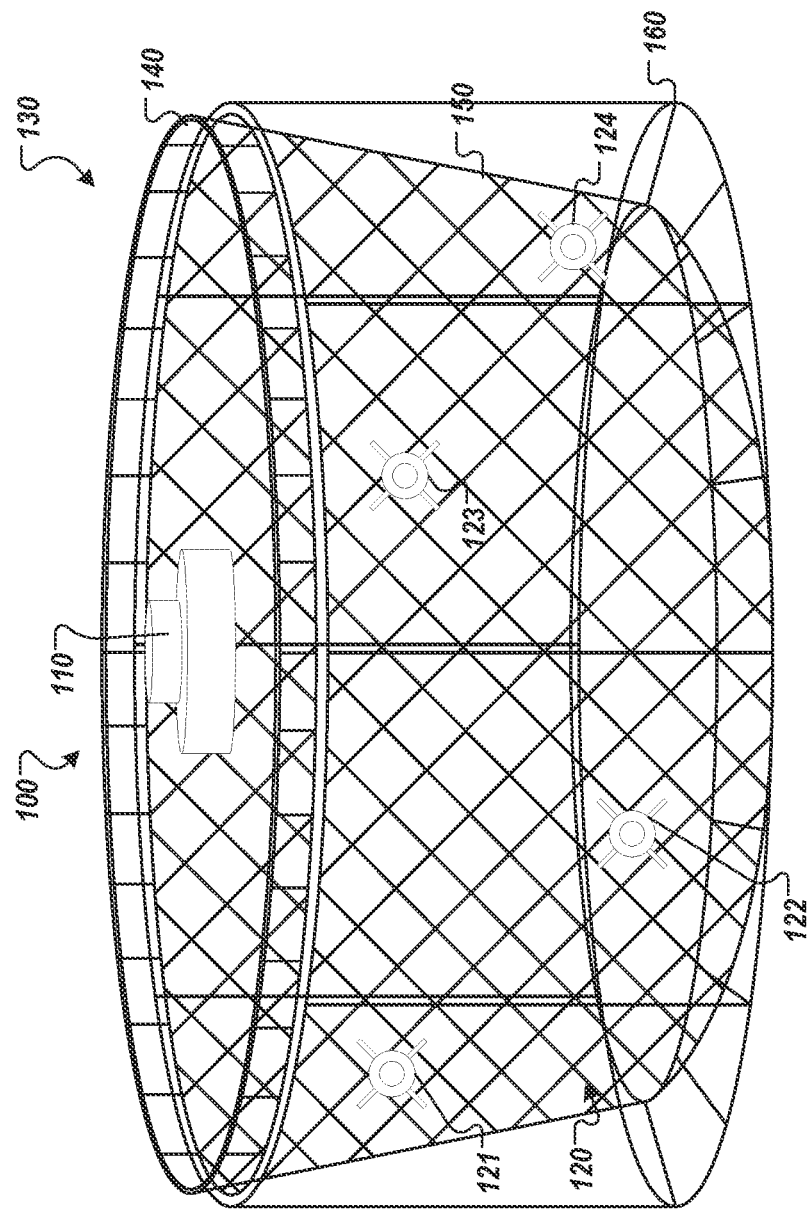
FIG. 1 is a schematic diagram of a net monitoring system.

Shown in FIG. 1 is a net monitoring system 100 including a control device 110 and two or more net monitoring devices 120, e.g., net monitoring device 121, 122, 123, and 124. The net monitoring system 100 is configured to provide monitoring operations for a fish pen 130 in a body of water. Some examples of the fish pen 130 include weights, anchoring devices, or guy lines, for tensioning the strands, or maintaining the fish pen 130 in a fixed location in the body of water.

The fish pen 130 includes a net 150 made out of a meshed material. The fish pen 130 may be made from any appropriate materials including rope, metal, or synthetic materials including plastic. The meshed material has a network of holes between the meshed materials.

The fish pen 130 includes a gangway 140 which floats at the surface of the body of water in which the fish pen 130 is positioned. The gangway 140 provides a structure for tasks remaining to maintaining the fish pen 130 such as observation of the fish, feeding operations, docking of water vehicles, or travel around the perimeter of the pen.

Figure 2A:
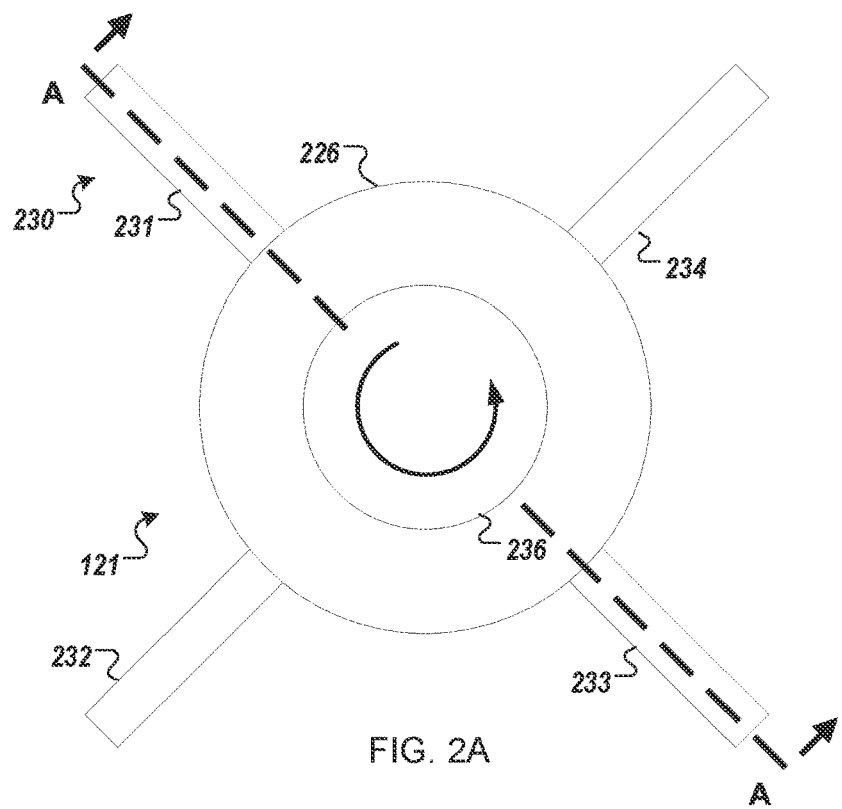
FIG. 2A is a top view schematic diagram of a net monitoring device.
Figure 2B:
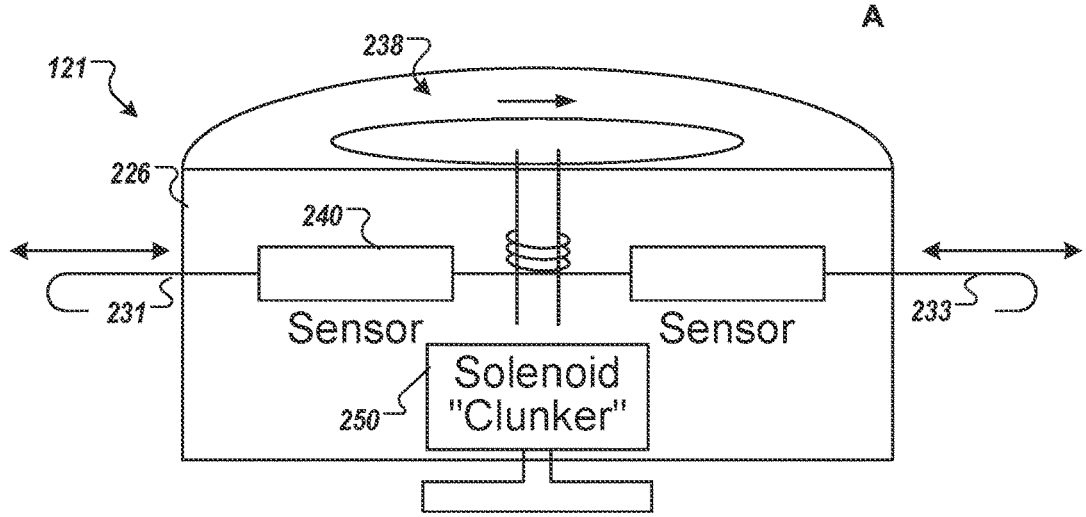
FIG. 2B is a cut-away side view schematic diagram of the net monitoring device
Figure 2C:
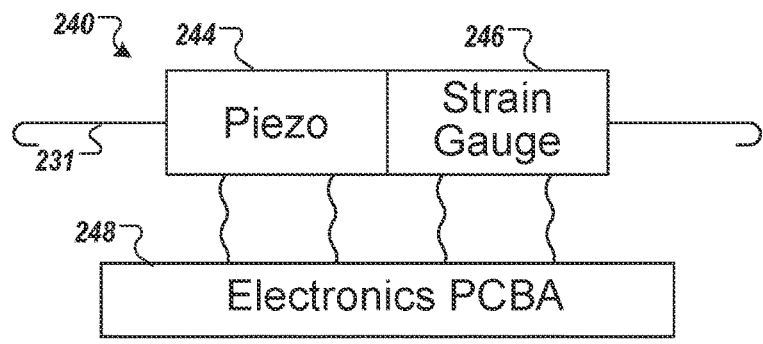
FIG. 2C is a side view schematic diagram of the force sensor a tensioning arm of the net monitoring device.

Reversibly attached to the net 150 are the net monitoring devices 120. Referring now to FIGS. 2A and 2B, the net monitoring device 121 is shown which can provide for any of the net monitoring devices 120. FIG. 2A shows a top-view of the net monitoring device 121 while FIG. 2B shows a cut-away view of the net monitoring device 121 along line A. The net monitoring device 121 has a housing 226 composed of a durable, non-reactive material suitable for use in underwater environments, which can include brackish water, salt water (e.g., brine), or freshwater environments. Examples of materials suitable for the housing 226 include plastic (e.g., polyvinyl chloride, or high density polyethylene), or metals (e.g., stainless steel).

The housing 226 is configured to be resistant to liquid ingress when submerged. In some examples, the housing 226 is ingress protection (IP) rated (e.g., IP58, or IP68 rated). The housing 226 provides protection for sensors, an impulse generating device, and control circuitry.

Tensioning arms 230 extend from the side walls of the housing 226. The net monitoring device 121 includes four tensioning arms 230, e.g., arm 231, arm 232, arm 233, and arm 234. Four tensioning arms 230 facilitate stable attachment to the net 150. Pairs of the tensioning arms 230 extend in opposing directions from the housing 226 and are arranged to extend in orthogonal directions from the housing 226. Such an arrangement of the tensioning arms 230 allow the tensioning arms 230 to monitor tension in two orthogonal directions. Some examples of the net monitoring device 121 include more than four tensioning arms 230, e.g., five, six, eight, or more, tensioning arms 230.

The distal ends of the tensioning arms 230, e.g., the ends furthest from the housing, are shaped to traverse a hole and positively engage a strand of the net 150 when attached to the net 150 and the tensioning arms 230 are drawn into the housing 226. The distal end of the arm 234 has a hook-like shape such that when the distal end traverses a hole in the net and is drawn into the housing 226, the hook end engages a strand of the net and tension in the arm 234 is transferred to the strand and thereby into the net 150.

Extending from the top of the housing 226 is a tensioner protrusion 236 which is rotatable with respect to the housing 226, indicated by the arrow. The tensioner protrusion 236 is configured to be operated, e.g., rotated, by a hand of a user. For example, the tensioner protrusion 236 has a greatest dimension (e.g., a length or a diameter) in a range from 4 cm to 10 cm (e.g., 5 cm, 6 cm, 7 cm, or 8 cm). The tensioner protrusion 236 extends from the top of the housing 226 by a distance which facilitates hand operation by the user (e.g., 2 cm, 3 cm, 4 cm, or 5 cm). In the example of FIG. 2A, the housing 226 and the tensioner protrusion 236 are circular in shape, though this is exemplary and non-limiting.

The tensioner protrusion 236 is operably coupled to a tensioning mechanism 238 such that rotations of the tensioner protrusion 236 causes the tensioning mechanism 238 to alter the extension state of the tensioning arms 230, e.g., retract the tensioning arms 230 into, or extend the tensioning arms 230 from, the housing 226. In alternative examples, the tensioner protrusion 236 is depressible to cause tensioning mechanism 238 to alter the extension state of the tensioning arms 230.

In an example, a user secures the net monitoring device 121 on the net 150 by arranging the net monitoring device 121 such that the distal ends of the tensioning arms 230 extend through holes in the net 150. The user operates the tensioner protrusion 236 which causes the tensioning mechanism 238 to retract the tensioning arms 230 into the housing 226. The distal ends of the tensioning arms 230 engage with a strand of the net 150 as the tensioning arms 230 retract into the housing 226. The user continues to operate the tensioner protrusion 236 and retract the tensioning arms 230 into the housing 226 until the tensioning arms 230 are retracted by a distance sufficient to cause increased tension in the net 150.

In an example, the user removes the net monitoring device 121 from the net 150 by rotating the tensioner protrusion 236 in a second direction (e.g., a second direction opposite to the first direction) which causes the tensioning mechanism 238 to extend the tensioning arms 230 from the housing. The user rotates the tensioner protrusion 236 until the tensioning arms 230 disengage from the net 150 and no longer cause increased tension in the net 150. The user then manipulates the net monitoring device 121 such that the distal ends of the tensioning arms 230 are removed from the respective holes of the net 150.

Each of the tensioning arms 230 includes a sensor array 240 which includes a piezoelectric generator 244 and a strain gauge 246, e.g., a force sensor. The piezoelectric generator 244 converts kinetic energy in the form of motion, e.g., vibration, translation, or shocks, into electrical energy. The piezoelectric generator 244 is in electrical connection with an onboard controller 248 which includes a power source, of the net monitoring device 121 such that the piezoelectric generator 244 provides power to the power source. In such examples, the net monitoring device 121 is passively powered when affixed to the net 150. Examples of the power source include a battery, a capacitor (e.g., a super capacitor, or an ultra-capacitor), or both.

The strain gauge 246 is arranged on the arm 231 to monitor tension forces along the longitudinal axis of the arm 231. Tension forces in the arm 231 cause the strain gauge 246 to generate tensions signals indicative of the tension force in the arm 231. The strain gauge 246 is connected to the onboard controller 248 which receives the tension signals from the strain gauge 246. The onboard controller 248 stores the tensions signals in a storage device, e.g., memory. The strain gauge 246 has a wide frequency bandwidth to detect both static tension, e.g., normal net dynamics, for example 0.1 Hz or less, and also high-frequency net dynamics, e.g., strain frequencies in a range from 1 Hz to 10 kHz.

The net monitoring device 121 includes an impulse generating device 250 which generates an impulse, e.g., a sudden acceleration motion. An example of the impulse generating device 250 includes a two-state solenoid. The impulse generating device 250 receives commands from the onboard controller 248 to generate an impulse and the impulse generating device 250 generates the impulse in response to the command. The impulse generated by the impulse generating device 250 causes an acceleration in the net monitoring device 121. The impulse is a force generated over a short time period by the impulse generating device 250 is large enough to detect but small enough that it won't damage the net. In some examples, the impulse is in a range from 20 Newtons to 75 Newtons, e.g., 50 Newtons.

Figure 3:
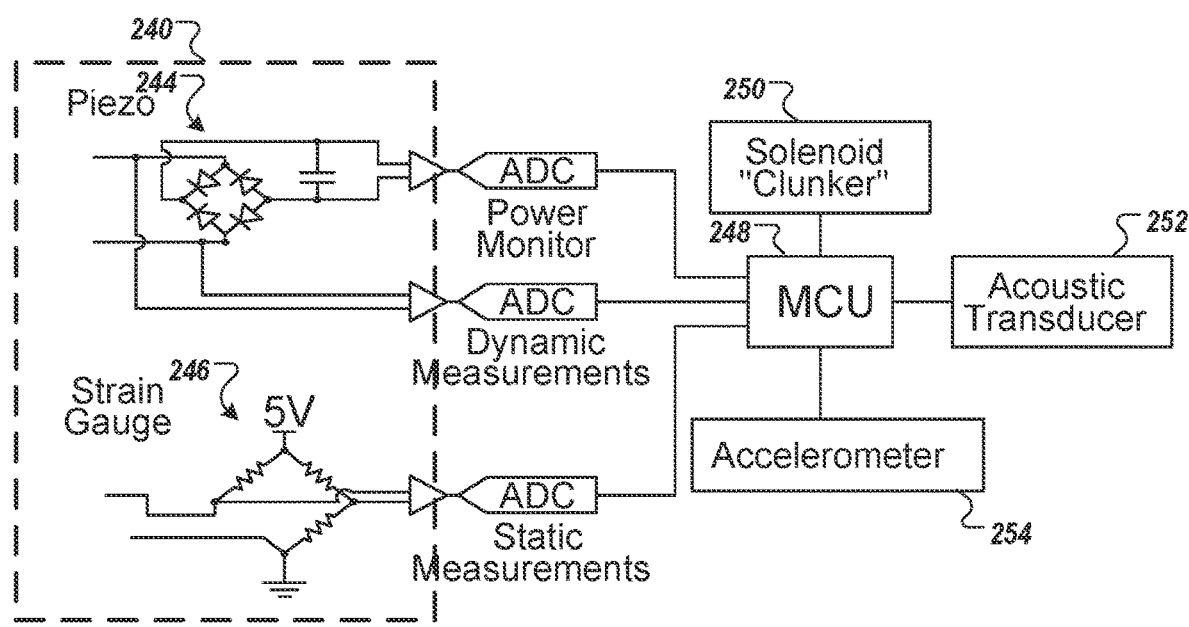
FIG. 3 is a circuit diagram detailing an example arrangement of the circuitry of the net monitoring device.

FIG. 3 shows an example circuit diagram of the onboard controller 248 of the net monitoring device 121. The onboard controller 248 is in electrical communication with the sensor array 240, including the piezoelectric generator 244 and the strain gauge 246. The onboard controller 248 receives power from the piezoelectric generator 244 and stores the power in the power source. The onboard controller 248 receives tension signals from the strain gauge 246 and stores the tension signals in memory.

The net monitoring device 121 includes an accelerometer 254 which generates an acceleration signal indicative of an acceleration force on the accelerometer 254. The accelerometer 254 is in electrical communication with the onboard controller 248 which receives the acceleration signal from the accelerometer 254. In some examples, the onboard controller 248 stores the acceleration signal in the storage device.

The onboard controller 248 is in electrical connection with a communications device, e.g., acoustic transducer 252, e.g., an acoustic modem. The onboard controller 248 is configured to encode one or more signals, such as the tension signal, or the acceleration signal, into a carrier signal. The acoustic transducer 252 is configured to transmit and receive signals through a liquid medium, e.g., the water surrounding the net monitoring device 121. For example, the acoustic transducer 252 receives the carrier signal from the onboard controller 248 and transmits the carrier signal through the water surrounding the net monitoring device 121. In alternative examples, the acoustic transducer 252 receives the one or more signals from the onboard controller 248 and encodes the one or more signal into the carrier signal and transmits the carrier signal through the water.

In some examples, the acoustic transducer 252 is a low-power acoustic transducer 252 which is configured to utilize electronics having low power requirements, include firmware or software to utilize low-power states, or a combination of both. In one example, the acoustic transducer 252 uses a power-optimized transducer, e.g., a small form factor transducer 252 having low power requirements, e.g., . . . .

In another example, the acoustic transducer 252, the controller 248, or both, compress the data to reduce the quantity of data and reduce the power utilized in transmission.

In another example, the acoustic transducer 252 transmits when the device 121 is within a predetermined communication distance of the control device 110. In such an example, the distance between the control device 110 and the device 121 is determined by a short acoustic signal is sent by the control device and/or the device 121, and a response signal is sent when the acoustic signal is received. A time-of-flight calculation is made to determine a distance value between the control device 110 and the device 121. If the distance is at or below the predetermined communication distance, the acoustic transducer 252 transmits collected data to the control device 110. Low communication distances utilize lower power requirements. In some examples, the communication distance is or is less than 50 m (e.g., is or less than 40 m, is or less than 30 m, is or less than 20 m, is or less than 10 m).

In some examples, the net monitoring device 121 is configured to form a mesh network with nearby net monitoring devices 120. In general, a mesh network is a local area network topology in which the infrastructure nodes, e.g., the net monitoring devices 120, connect directly, dynamically and non-hierarchically. The net monitoring device 121 is configured to create, participate, or both, in the mesh network to extend communication range for the net monitoring devices 120 participating in the mesh network. For example, the net monitoring device 121 participating in the mesh network may relay messages to or from the control device 110 to net monitoring devices 120 which are out of communications range of the control device 110 when not participating in the mesh network. Forming a mesh network facilitates shorter transmission distances and reduced power consumption. In the mesh network, a node transmits to the nearest neighbor node, rather than transmitting the entire distance to the control device 110, In one example, the monitoring device 121 and monitoring device 122 operate as a nodes in a mesh network. The monitoring device 122 transmits data to monitoring device 121 which relays the information to the control device 110.

Figure 4A:
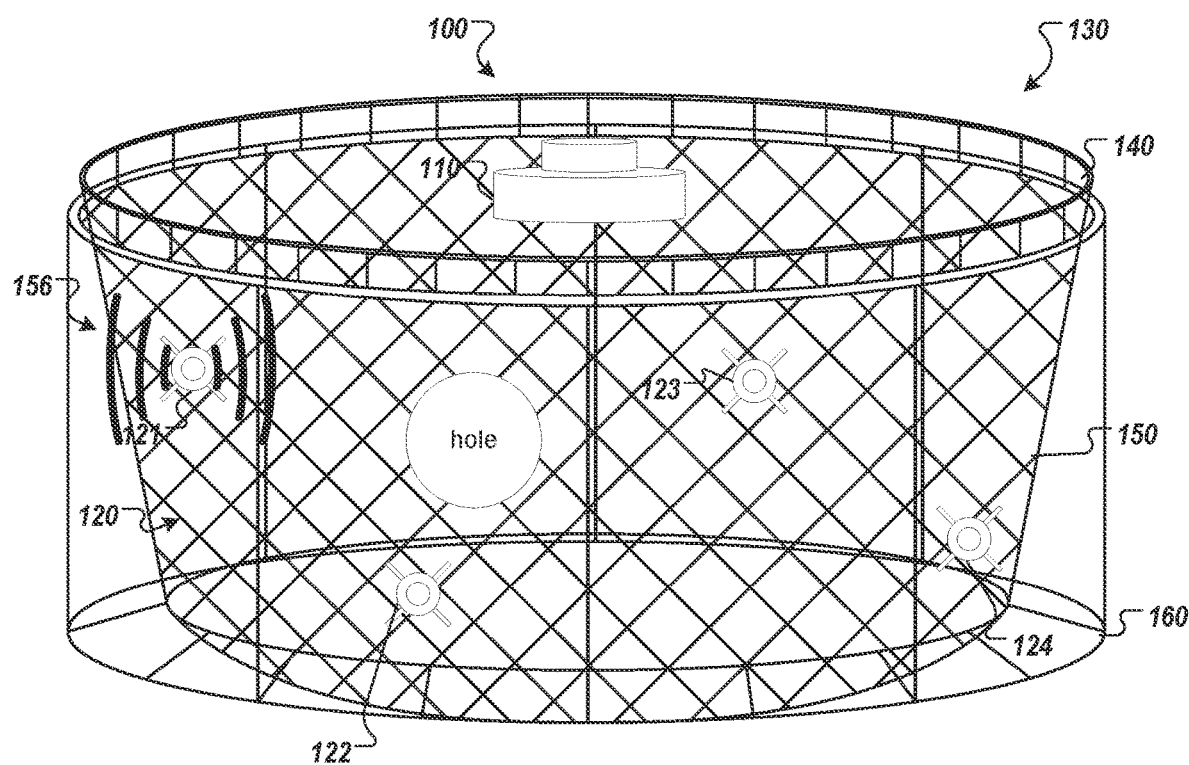
FIGS. 4A-4C are oblique view schematic diagrams of a system of net monitoring devices producing a tension signal and communicating an acoustic signal to the control device.
Figure 4B:
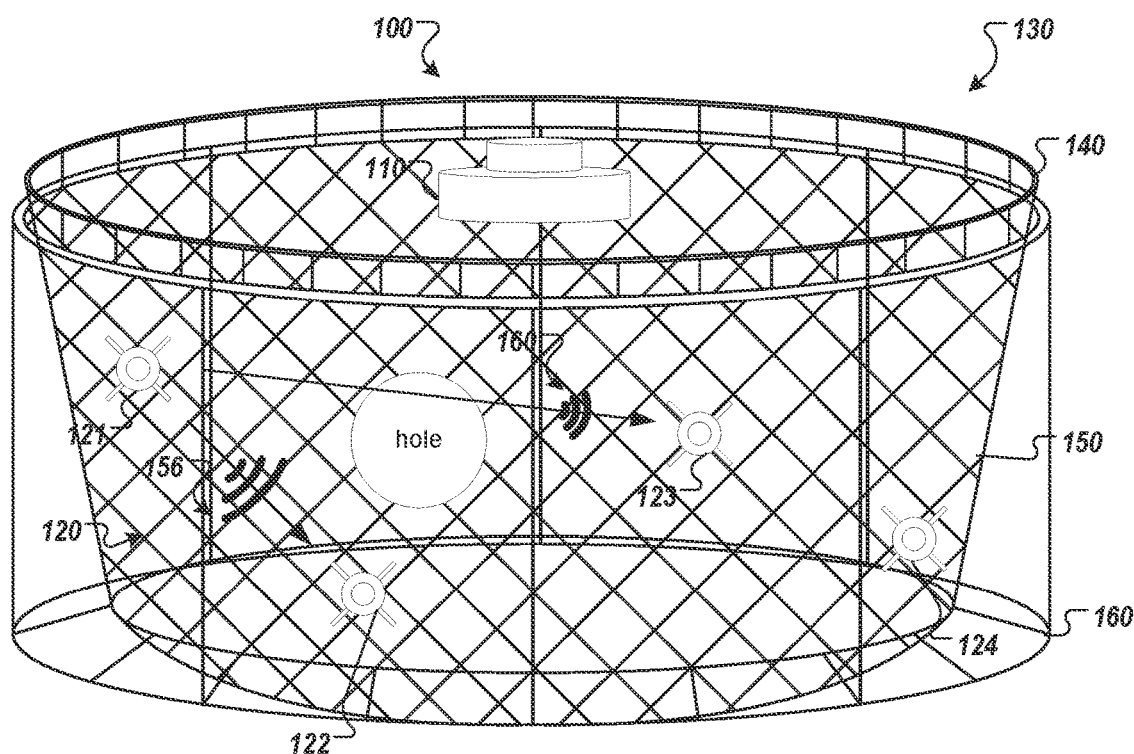
Figure 4C:
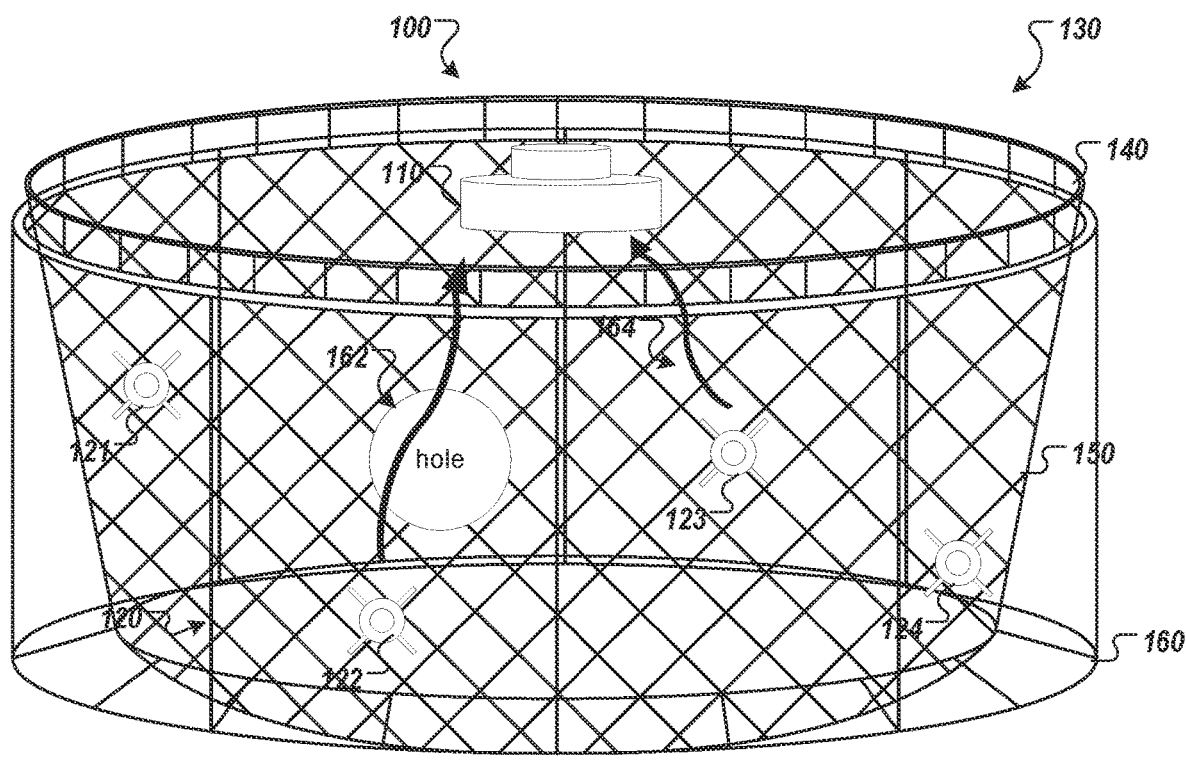

FIGS. 4A-4C schematically illustrate the process by which the net monitoring system 100 generates impulse signals in the net 150, monitors tension signals indicative of the impulse signal traveling through the strands of the net 150, and communicates information to the control device 110. In the diagram of FIG. 4A, net monitoring device 121 commands the impulse generating device 250 to generate an impulse. The impulse generating device 250 generates an impulse which is communicated through the tensioning arms 230 to the strands of the net 150.

As shown in FIG. 4B, the impulse signal 156 traverses the strands of the net 150. In general, the impulse signal 156 traverses the strands of the net 150 omnidirectionally. Two paths of the impulse signal 156 are shown: the first path between the net monitoring device 121 and the net monitoring device 122, and the second path between net monitoring device 121 and the net monitoring device 123, though the paths are exemplary and non-limiting.

The impulse signal 156 traverses the strands of the net 150 along the first path and arrives at the location at which the net monitoring device 122 is secured to strands of the net 150. The impulse signal 156 causes tension forces in the tensioning arms 230 of the net monitoring device 122 which transmit signals to the onboard controller 248 indicative of the impulse signal 156.

The impulse signal 156 traverses the strands of the net 150 along the second path and is disrupted by a defect, e.g., a break in one or more strand of the net. Examples of defects include severed strands, (as in FIGS. 4A-4C), a bulge (e.g., an area of the net 150 in which tension is increased or decreased from average), biofouling (e.g., biomatter buildup, seaweed, algal growth), fraying, or an entangled animal (e.g., an entangled fish, or an entangled predator). The second path is shown linearly traversing the defect, though in general the impulse signal 156 traverses the network of strands surrounding a severed strand. In general, defects reduce the strength of any "impulse" signal traversing the region of the defect. For example, a bulge would reduce the strength of signals transmitted through the bulge, while a severed strand The system will A) compare signal strengths from neighboring nodes and B) compare signal strengths against historical average signal strengths. Both of these comparisons will allow the controller to identify the presence of a net defect.

The disrupted impulse signal 160 is received by the net monitoring device 123 as increased tension forces in the tensioning arms 230 which transmit tension signals to the onboard controller 248 indicative of the disrupted impulse signal 160. The onboard controller 248 of net monitoring device 122 and net monitoring device 123 encode the tension signals indicative of the impulse signal 156 and the disrupted impulse signal 160, respectively, into a carrier signal and provides the carrier signal to the acoustic transducers 252.

The acoustic transducers 252 generates an acoustic signal and transmits the carrier signals, e.g., carrier signal 162 and carrier signal 164, into the water surrounding net monitoring device 122 and net monitoring device 123. The carrier signals are shown as lines directed at the control device 110 though this is for ease of reference, and is not representative of the directionality in which the carrier signals are transmitted in the water. In general, the carrier signals are transmitted by the acoustic transducers 252 omnidirectionally.

The control device 110 is arranged to receive acoustic signals transmitted in the water. For example, the control device 110 is depicted partially submerged in the water within the fish pen 130 of FIG. 4C. In some examples, the control device 110 may be mounted, releasably attached, or anchored to the gangway 140 and an acoustic transducer partially or fully submerged in the water to receive transmitted signals.

The control device 110 receives acoustic signals, e.g., the carrier signals, transmitted through the water. The control device 110 determines from the received signal the presence of the defect.

Figure 5:
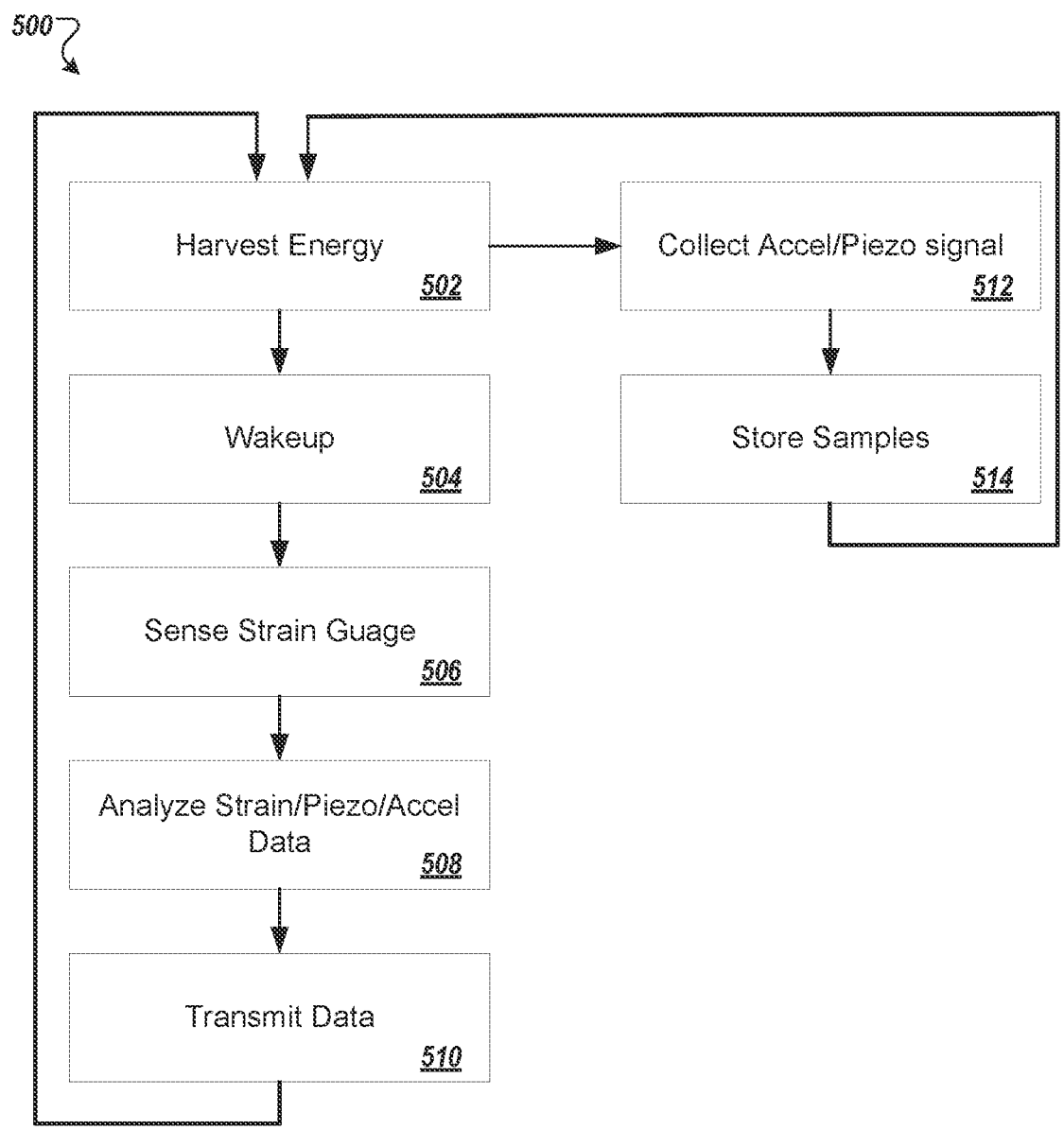
FIG. 5 is a flow chart diagram of a low-power net monitoring method for a net monitoring device.

The net monitoring system 100 is substantially self-sufficient, e.g., the net monitoring devices 120 generate power from motion of the tensioning arms 230, communicate sparsely with the net monitoring system 100, and maintain tension in the strands of the fish pen 130 between tensioning operations by the user. FIG. 5 is a flow chart diagram of an example process by which the net monitoring system 100 performs the net monitoring.

In general, the net monitoring devices 120 operate in a low-power mode during which the net monitoring devices 120 generate energy (step 502) from motion of the tensioning arms 230 induced from the surroundings, e.g., from wave energy, or motion of the strands on which the tensioning arms 230 attach. The piezoelectric generator 244 generates energy based on the motion and the net monitoring devices 120 stores the generated energy in a power source.

At some times, the net monitoring devices 120 enters an active mode during which detection, analysis, and communication processes are performed. The times at which the net monitoring devices 120 enter the active mode can be regularly scheduled (e.g., daily or weekly at a specific time), irregularly or intermittently scheduled (e.g., daily at random times), random (e.g., randomly generated times), triggered (e.g., when a certain condition is met, such as a total power stored or the detection of a defect, or when a command is received to enter active mode), or a combination.

The net monitoring devices 120 performs a wakeup process (step 504). The wakeup process can include, but is not limited to, providing power to previously de-powered components, or performing self-analysis on one or more components (e.g., trouble-shooting, communication of error messages). In an example, wakeup is triggered by a timer/alarm that periodically triggers wakeup on a set schedule (e.g., hourly, daily). In another example, wakeup is triggered by shocks that generate an acceleration signal from the accelerometer above a trigger threshold.

An exemplary wakeup process includes the controller 248 enabling a high-speed oscillator to execute instructions quickly. The sensors and front-end circuitry are powered up and allowed to stabilize. The controller 248 performs analog measurements of the sensors and, occasionally, sends/receives any other telemetry.

The net monitoring devices 120 receive signals from the strain gauge 246 (step 506). The tension in the tensioning arms 230 causes strain in the strain gauge 246 which the sensor array 240 transmits to the onboard controller 248 as a strain signal.

The net monitoring devices 120 analyze the received data (step 508). The onboard controller 248 analyzes signals from the sensor array 240, the strain gauge 246, the piezoelectric generator 244, the acoustic transducer 252, the impulse generating device 250, the accelerometer 254, combinations thereof, or other components providing data to the onboard controller 248. In some examples, the onboard controller 248 analyzes signals that were stored during step 502, signals that were received following the step 504, or both.

Optionally, the net monitoring devices 120 transmit data into the surrounding water (step 510). The onboard controller 248 provides a signal to the acoustic transducer 252 which embeds the signal into a carrier signal and transmits the carrier signal into the surrounding water. Examples of such are listening for (e.g., detecting reception of) incoming messages from the mesh network, retransmiting mesh network messages as needed, or both. Alternatively, the data can be buffered and transmitted only periodically, e.g., the data does not need to be transmitted during each wake up cycle. An example of this is transmitting data every 100th wakeup event.

The net monitoring devices 120 return to low-power, e.g., harvest energy, mode (step 502). This includes powering down the high-speed oscillator. This process then waits for the next wakeup event to be triggered.

In general, the net monitoring devices 120 can perform steps 504, 506, 508, or 510 in any order. In some examples, the net monitoring devices 120 perform a process having fewer steps. For example, the net monitoring devices 120 collect data from a subset of the signals from the internal components without transmitting data from the acoustic transducer 252. In one example, the net monitoring devices 120 collect data from the piezoelectric generator 244, the accelerometer 254, or both (step 512).

In such an example, the onboard controller 248 stores the collected data from the subset of the signals (step 514) in an onboard storage device. The net monitoring devices 120 return to low-power, e.g., harvest energy, mode (step 502).

Figure 6:
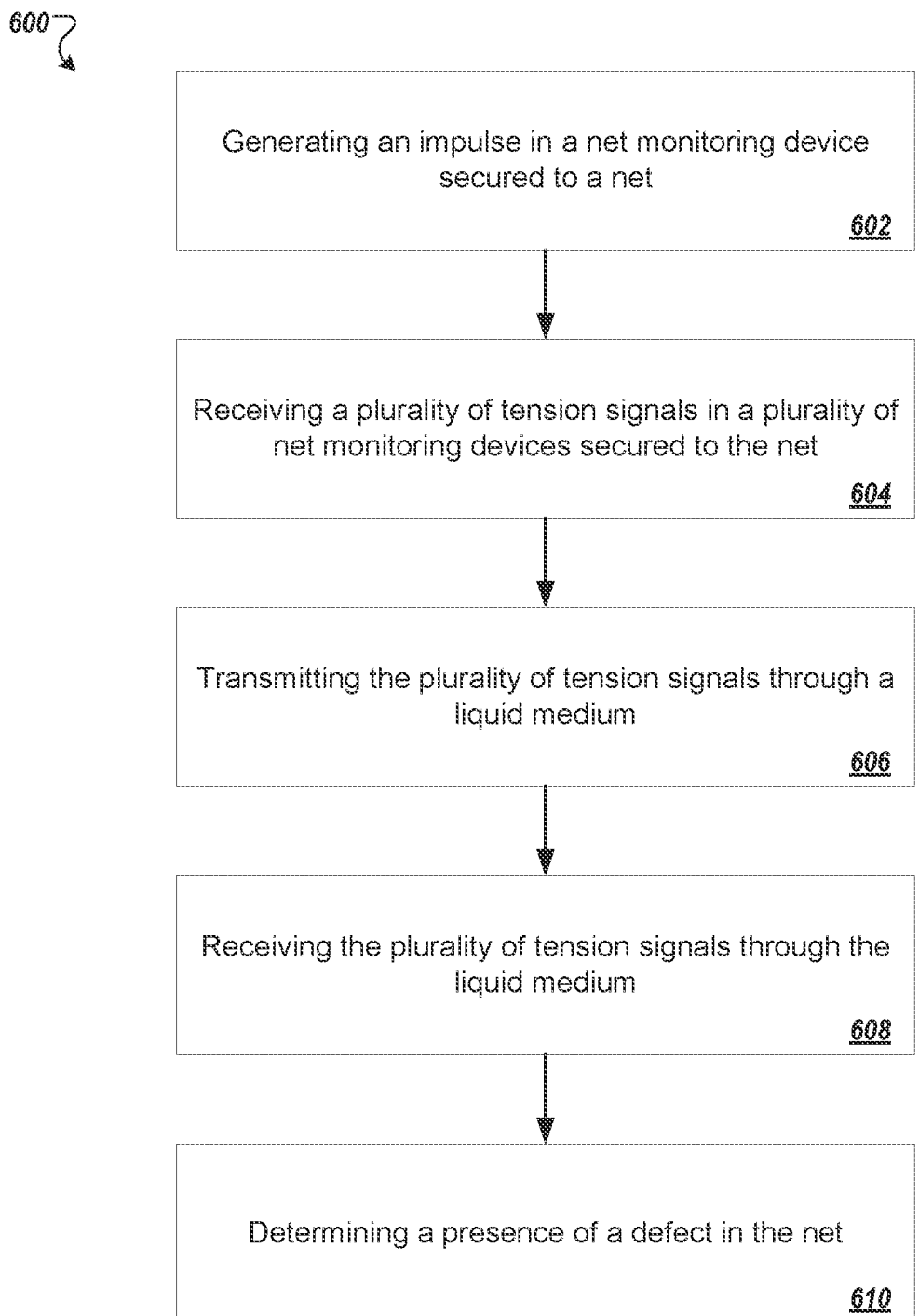
FIG. 6 is a flow chart diagram of a method for monitoring a net.

Provided herein is a method for monitoring a fish net. FIG. 6 is a flow chart diagram showing the method 600. The method includes generating an impulse in a net monitoring device secured to a net (step 602). The net monitoring devices 120 generate an impulse with the impulse generating device 250. The impulse is communicated to the strands of a net through the tensioning arms 230.

The method includes receiving a plurality of tension signals in a plurality of net monitoring devices secured to the net (step 604). The tension in the strands of the net 150 communicate the tension signal (e.g., the impulse signal) along the strand network. The impulse signal cause motion in the tensioning arms 230 of at least a second of the net monitoring devices 120. The impulse signal is received by the sensor array 240 of the tensioning arms 230 and communicated to the onboard controller 248.

The method includes transmitting the plurality of tension signals through a liquid medium (step 606). The impulse signal is embedded in a carrier signal and communicated into a liquid medium (e.g., water) surrounding the net monitoring devices 120. The acoustic transducer 252 communicates the carrier signal into the surrounding water.

The method includes receiving the plurality of tension signals through the liquid medium (step 608). The control device 110 is arranged to receive acoustic signals transmitted through the liquid medium, e.g., the water. The control device 110 receives the carrier signal from the water.

The method includes determining a presence of a defect in the net (step 610). The control device 110 receives the carrier signal and decodes the data transmitted from the net monitoring devices 120 through the water from the carrier signal. The control device 110 analyzes the transmitted data to determine the presence of a defect in the net 150.

The following disclosure is an example computer system which can provide one or more components of the example system 100 described here, e.g., the control device 110, the net monitoring devices 120, or the onboard controller 248. For example, the system includes a processor, a memory, a storage device, and one or more input/output interface devices. Each of the components can be interconnected, for example, using a system bus.

The processor is capable of processing instructions for execution within the system. The term "execution" as used here refers to a technique in which program code causes a processor to carry out one or more processor instructions. In some implementations, the processor is a single-, or multi-threaded processor. The processor is capable of processing instructions stored in the memory or on the storage device.

The memory stores information within the system. In some implementations, the memory is a computer-readable medium. In some implementations, the memory is a volatile memory unit. In some implementations, the memory is a non-volatile memory unit.

The storage device is capable of providing mass storage for the system. In some implementations, the storage device is a non-transitory computer-readable medium. In various different implementations, the storage device can include, for example, a hard disk device, an optical disk device, a solid-state drive, a flash drive, magnetic tape, or some other large capacity storage device. In some implementations, the storage device may be a cloud storage device, e.g., a logical storage device including one or more physical storage devices distributed on a network and accessed using a network.

The input/output interface devices provide input/output operations for the system. In some implementations, the input/output interface devices can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, etc.

Software can be realized by instructions that upon execution cause one or more processing devices to carry out the processes and functions described above, for example, monitoring defects in nets. Such instructions can include, for example, interpreted instructions such as script instructions, or executable code, or other instructions stored in a computer readable medium.

In some examples, the system is contained within a single integrated circuit package. A system of this kind, in which both a processor and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices.

Although an example processing system has been described, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as storing, maintaining, and displaying data can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM, DVD-ROM, and Blu-Ray disks. The processor and the memory can be supplemented by, or incorporated in, special purpose logic circuitry.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A net monitoring system, comprising:
   a plurality of net monitoring devices, each net monitoring device comprising:
   a housing;
   a plurality of tensioning arms, each tensioning arm reversibly extendable through the housing and configured to reversibly secure to a net, each tensioning arm comprising a force sensor configured to generate a tension signal indicative of a tension applied to the corresponding tensioning arm;
   a tensioning mechanism configured concurrently retract the plurality of tensioning arms into the housing;
   an impulse generating device, configured to generate an impulse responsive to a command; and
   a communications device configured to receive the tension signals from the plurality of force sensors, and transmit the tension signals through water; and
   a controller, configured to:
   command at least one of the plurality of net monitoring devices to generate the impulse;
   receive the tension signals responsive to the command to generate the impulse; and
   determine, based on the received tension signals, a presence of a defect in a net on which the plurality of net monitoring devices are installed.

2. The net monitoring system of claim 1, wherein the defect is a severed strand, a bulge, a biofouling, or an animal.

3. The net monitoring system of claim 1, wherein the communications device and the controller are configured to communicate with acoustic signals.

4. The net monitoring system of claim 1, wherein the communications device is configured to encode the tension signals in a carrier signal and transmit the carrier signal through the water.

5. The net monitoring system of claim 1, wherein the plurality of net monitoring devices are configured to transmit the tension signals on a regular schedule, an irregular schedule, in response to receiving a command to transmit the signals, or a combination thereof.

6. A net monitor device, comprising:
   a housing;
   a plurality of tensioning arms, each tensioning arm reversibly extendable through the housing and configured to reversibly secure to a net, each tensioning arm comprising a force sensor configured to generate a tension signal indicative of a tension applied to the corresponding tensioning arm;
   a tensioning mechanism configured concurrently retract the plurality of tensioning arms into the housing;
   an impulse generating device, configured to generate an impulse in the plurality of tensioning arms; and
   a transmitter configured to receive the tension signals from the plurality of force sensors, and transmit the tension signals through water.

7. The net monitoring device of claim 6, wherein the plurality of tensioning arms comprises one or more pairs of tensioning arms, each pair of tensioning arms arranged in parallel.

8. The net monitoring device of claim 7, wherein the tensioning mechanism is configured to apply the tensioning force to each pair of the plurality of tensioning arms in parallel and in opposing directions.

9. The net monitoring device of claim 6, wherein the tensioning mechanism is configured to apply a substantially equal tensioning force to the plurality of tensioning arms concurrently.

10. The net monitoring device of claim 6, wherein the tensioning mechanism is configured to be operated by a hand of a user.

11. The net monitoring device of claim 6, wherein the tensioning mechanism is configured to retract the plurality of tensioning arms responsive to a user input, or a command received by the transmitter.

12. The net monitoring device of claim 6, wherein the net monitoring device is configured to be positively buoyant.

13. The net monitoring device of claim 6, wherein the impulse generating device is a two-state solenoid.

14. The net monitoring device of claim 6, further comprising a power source, and a power generation module.

15. The net monitoring device of claim 14, wherein the power source is a battery, or a capacitor.

16. The net monitoring device of claim 14, wherein the power generation module comprises a piezoelectric device configured to generate power based on motion of the plurality of tensioning arms.

17. A method of monitoring a net, comprising:
generating an impulse in one of a plurality of net monitoring devices secured to a net;
receiving, responsive to the generating, in the remaining plurality of net monitoring devices secured to the net, a plurality of tension signals from a plurality of force sensors in each net monitoring device;
transmitting the plurality of tension signals through water;
receiving the plurality of tension signals through the water; and
determining, based on the received plurality of tension signals, a presence of a defect in the net.

18. The method of claim 17, the transmitting comprising encoding the plurality of tension signals into a carrier signal, and transmitting the carrier signal through the water, and the receiving comprising receiving the carrier signal and decoding the plurality of tension signals from the carrier signal.

\* \* \* \* \*

UNITED STATES PATENT AND TRADEMARK OFFICE
CERTIFICATE OF CORRECTION

| | | |
|---|---|---|
| PATENT NO. | : 12,426,577 B2 | Page 1 of 1 |
| APPLICATION NO. | : 18/202578 | |
| DATED | : September 30, 2025 | |
| INVENTOR(S) | : Pham et al. | |

It is certified that error appears in the above-identified patent and that said Letters Patent is hereby corrected as shown below:

On the Title Page

Item (71), (Applicant):
Delete "TidalX Al Inc," and insert -- TidalX AI Inc., --.

Signed and Sealed this
Twenty-seventh Day of January, 2026

John A. Squires
*Director of the United States Patent and Trademark Office*